(12) United States Patent
Ueno

(10) Patent No.: US 8,366,861 B2
(45) Date of Patent: Feb. 5, 2013

(54) ANODE BONDING METHOD AND PRODUCING METHOD OF LIQUID DROPLET DISCHARGING HEAD

(75) Inventor: Nobuhiro Ueno, Takatsuki (JP)

(73) Assignee: Konica Minolta Holdings, Inc., Tokyo (JP)

( * ) Notice: Subject to any disclaimer, the term of this patent is extended or adjusted under 35 U.S.C. 154(b) by 409 days.

(21) Appl. No.: 12/733,364

(22) PCT Filed: Aug. 29, 2008

(86) PCT No.: PCT/JP2008/065510
§ 371 (c)(1),
(2), (4) Date: Feb. 25, 2010

(87) PCT Pub. No.: WO2009/031463
PCT Pub. Date: Mar. 12, 2009

(65) Prior Publication Data
US 2010/0206475 A1    Aug. 19, 2010

(30) Foreign Application Priority Data

Sep. 5, 2007    (JP) ................................. 2007-229940

(51) Int. Cl.
*B32B 37/00*    (2006.01)
(52) U.S. Cl. ................................................... 156/274.4
(58) Field of Classification Search ............... 156/272.2, 156/272.4
See application file for complete search history.

(56) References Cited

FOREIGN PATENT DOCUMENTS

| JP | 02076237 A | * | 3/1990 |
|---|---|---|---|
| JP | 11-087201 A | | 3/1999 |
| JP | 11087201 A | * | 3/1999 |
| JP | 11-192712 A | | 7/1999 |
| JP | 2006-350021 A | | 12/2006 |
| JP | 2006350021 A | * | 12/2006 |
| JP | 2007-015243 A | | 1/2007 |

OTHER PUBLICATIONS

Machine Translation JP 2006350021 A; Dec. 2006.*
Machine Translation JP 11087201 A; Mar. 1999.*

* cited by examiner

*Primary Examiner* — Daniel McNally
(74) *Attorney, Agent, or Firm* — Holtz, Holtz, Goodman & Chick, PC

(57) ABSTRACT

Provided is an anode bonding method by which a silicon substrate and a glass substrate are well anodically bonded without generating positional shift, even when an electrode cannot be arranged on a surface on the opposite side to a bonding surface of a glass substrate and the bonding surface is large. The method for anodically bonding the glass substrate and the silicon substrate is provided with a step of placing on the glass substrate the silicon substrate whereupon a through hole is arranged; a step of bringing the anode electrode into contact with the surface of the overlapped silicon substrate opposite to the surface facing the glass substrate, and bringing an cathode electrode into contact with the glass substrate through the through hole arranged on the silicon substrate; and a step of applying a direct current voltage to the anode electrode and the cathode electrode in a state where the glass substrate and the silicon substrate are heated.

9 Claims, 10 Drawing Sheets

FIG. 1
FIG. 2
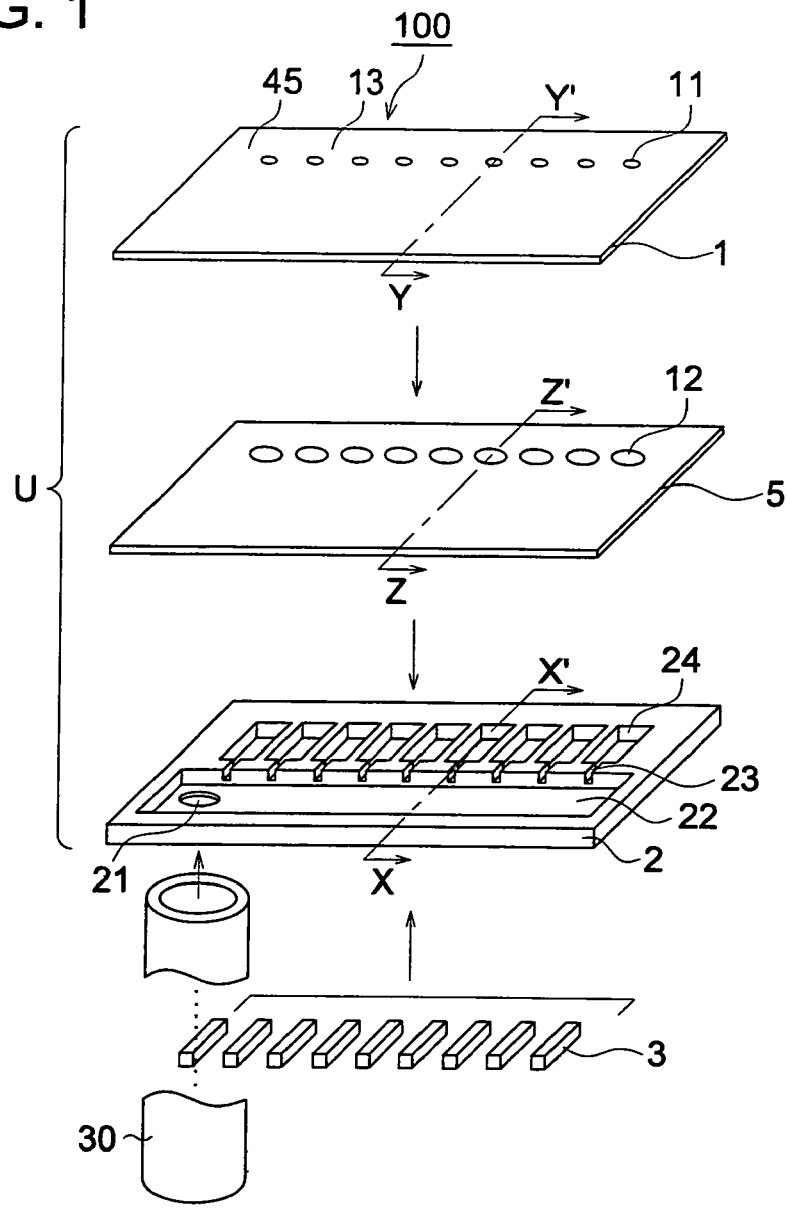
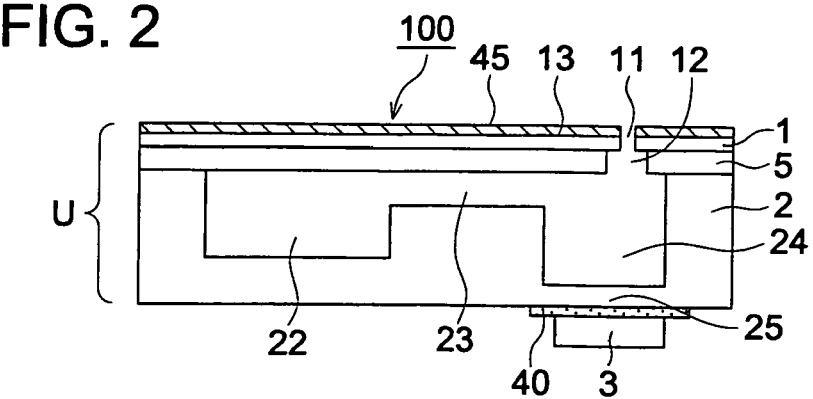

ANODE BONDING METHOD AND PRODUCING METHOD OF LIQUID DROPLET DISCHARGING HEAD

This application is the United States national phase application of International Application PCT/JP2008/065510 filed Aug. 29, 2008.

TECHNICAL FIELD

The present invention relates to an anode bonding method and a producing method of a liquid droplet discharging head.

BACKGROUND ART

In recent years, the degree of attention for a minute mechanical system (also called MEMS (Micro Electro Mechanical System) and a micro-machine) produced by a microscopic processing technology developed with a semiconductor and the like has been increasing. Among these micro-machines, there is technology in which a silicon substrate and a borosilicate glass substrate (hereafter, referred to as a glass substrate) containing movable ions are made in contact with each other, and on this condition, a silicon wafer and a glass substrate are bonded by an anode bonding.

As an example utilizing an anode bonding technology, there is an ink jet head disclosed by Patent Document 1. This ink jet head is configured in a three layer structure in which a nozzle plate (upper substrate) at an upper side and an electrode substrate (lower substrate) at a lower side are laminated across a cavity plate (intermediate substrate). The intermediate substrate is made of a silicon substrate, and the upper substrate and the lower substrate are made of a glass substrate. The lower substrate and the intermediate substrate are brought in contact with each other and are held in this contact condition. The upper substrate is held on a non-contact condition above them, and the lower substrate and the intermediate substrate are heated to increase their temperature, and then, the lower substrate and the intermediate substrate are bonded by an anode bonding. Thereafter, the upper substrate is shifted downward onto the surface of the intermediate substrate, and the upper substrate and the intermediate substrate are bonded by the anode bonding.

Further, in Patent Document 2, there is an example in which plural silicon substrates are arranged on both sides of a glass substrate, and the silicon substrates and the glass substrate are bonded by an anode bonding. In this case, the glass substrate is made a little bit larger than the silicon substrate, and the bonding is conducted on the condition that a cathode is brought in contact with a part of the glass substrate located at the outside of the overlapped portion between the glass substrate and the silicon substrate.

Patent document 1: Japanese Unexamined Patent Publication No. 11-192712 official report
Patent document 2: Japanese Unexamined Patent Publication No. 11-87201 official report

DISCLOSURE OF THE INVENTION

Problem to be Solved by the Invention

In a concrete example of the anode bonding method described in Patent Document 1, when three sheets of an upper substrate, an intermediate substrate and a lower substrate are laminated, the intermediate substrate is made on the condition such that a part of the intermediate substrate protrudes outside from the lower substrate and the upper substrate. The electrode is provided to this protruding part. Therefore, the electrode is provided to an outer peripheral part of the intermediate substrate. Since the intermediate substrate is a silicon substrate, its conductivity is higher as compared with a glass substrate. Therefore, even if an electrode is provided to the outer peripheral part, a large voltage drop is not caused even on the surface to be bonded distant from the electrode. Further, although the lower substrate and the upper substrate have a low conductivity, an electrode can be provided with a large size to the surface opposite to the surface to be bonded. Therefore, the anode bonding can be carried out in good order. However, if the intermediate substrate is made of a glass substrate and the upper substrate and the lower substrate are made of a silicon substrate, since the conductivity of the glass substrate is lower as compared with the silicon substrate, as a surface to be bonded becomes distant more from an electrode provided to an outer peripheral part of the glass substrate, a voltage drop becomes larger. As a result, the anode bonding becomes difficult. This matter that anode bonding becomes difficult is also the same for the case of Patent Document 2.

Moreover, in the anode bonding method described in Patent document 2, an electrode is provided in a peripheral part of a glass substrate. In such a case where the electrode is brought in contact with the peripheral part, it is necessary to apply a pressing force to some extent in order to bring it in sufficient contact without causing insufficient contact. However, in the case that the pressing force is applied to a peripheral part of the glass substrate, an uplift occurs on a surface to be bonded opposite to an end portion applied with the pressing force or positional deviations takes place relatively between the laminated substrates. In order to counter the above problems, it may be considered to provide a supporting member to the surface opposite to the surface of the glass substrate applied with the pressing force so as to oppose this pressing force. However, it becomes necessary to conduct an adjustment to make the thickness of this supporting member to fit with the thickness of a member located at the lower side of the glass substrate for each time of bonding. As a result, work becomes complicated.

The present invention has been achieved in view of the above-mentioned problems, and an object is to provide an anode bonding method and a producing method of a liquid droplet discharging head by employing this anode bonding method, in which the anode bonding can be conducted in good order without causing positional deviations at the time of bonding a silicon substrate and a glass substrate by the anode bonding, even in the case that an electrode cannot be provided to a surface opposite to a surface of the glass substrate to be bonded or even in the case that the surface to be bonded is too large.

Means for Solving the Problems

The above-mentioned problems can be solved by the following structures.
1. In an anode bonding method of bonding a glass substrate and a silicon substrate by an anode bonding, the anode bonding method is characterized by comprising:
   a process of piling up the silicon substrate provided with a through hole on the glass substrate;
   a process of bringing an anode electrode in contact with a surface of the laminated silicon substrate opposite to a surface facing the glass substrate and bringing a cathode electrode in contact with the glass substrate through the through hole provided in the silicon substrate; and a process of applying a direct current voltage between the anode electrode and the cathode electrode on the condition that the glass substrate and the silicon substrate are heated.

2. The anode bonding method described in 1 is characterized in that the anode electrode and the cathode electrode are shifted from a direction vertical to the surfaces of the silicon substrate laminated on the glass substrate and are brought in contact with the silicon substrate and the glass substrate respectively.

3. The anode bonding method described in 1 or 2 is characterized in that the cathode electrode consists of a metal section to be applied with a direct current voltage and a glass sections which is combined with the metal section and is brought in contact with the glass substrate.

4. The anode bonding method described in 1 is characterized in that the metal section to be applied with the direct current voltage in the cathode electrode being in contact with the glass substrate is located within 20 mm from an arbitrary position on a region where the glass substrate and the silicon substrate are bonded by the anode bonding.

5. In an anode bonding method of sandwiching a glass substrate between silicon substrates and bonding the glass substrate and the silicon substrates by an anode bonding, wherein one silicon substrate among the two silicon substrates is provided with a through hole, the anode bonding method is characterized by comprising:

a process of piling up another silicon substrate, the glass substrate, and the one silicon substrate provided with the through hole in this order on an anode electrode plate which is an electrode at the time of conducting an anode bonding;

a process of bringing an anode electrode in contact with a surface of the laminated one silicon substrate opposite to a surface facing the glass substrate;

a process of bringing a cathode electrode in contact with the glass substrate through the through hole provided in the one silicon substrate; and a process of applying a direct current voltage between the anode electrode plate and the cathode electrode and between the anode electrode and the cathode electrode on the condition that the another silicon substrate and the glass substrate are heated.

6. The anode bonding method described in 5 is characterized in that the anode electrode and the cathode electrode are shifted from a direction vertical to the surfaces of the one silicon substrate laminated on the glass substrate and are brought in contact with the one silicon substrate and the glass substrate respectively.

7. The anode bonding method described in 5 or 6 is characterized in that the cathode electrode consists of a metal section to apply a direct current voltage and a glass sections which is combined with the metal section and is brought, in contact with the glass substrate.

8. The anode bonding method described in 5 is characterized in that the metal section to apply the direct current voltage in the cathode electrode being in contact with the glass substrate is located within 20 mm from an arbitrary position on a region where the glass substrate and the two silicon substrates are bonded by the anode bonding.

9. A producing method of a liquid droplet discharging head, comprising:

a process of preparing a silicon substrate in which a nozzle plate having plural nozzle holes is formed;

a process of preparing a glass substrate in which an intermediate plate is formed wherein the intermediate plate has intermediate through holes which have ports larger than that of the nozzle holes and communicate with the nozzle holes respectively when the glass substrate is bonded with the silicon substrate in which the nozzle plate is formed;

a process of preparing a silicon substrate in which pressure chamber grooves are formed, wherein the pressure chamber grooves form pressure chambers which communicate with the nozzle holes through the intermediate through holes respectively when the silicon substrate is bonded with the glass substrate and the pressure chambers discharge liquid through the nozzle holes due to a change in volume by displacement of an actuator; and a process of bonding the silicon substrate in which the nozzle plate is formed and the glass substrate in which the intermediate plate is formed, and bonding the glass substrate in which the intermediate plate is formed and the silicon substrate in which the pressure chamber groove is formed, so that the pressure chambers are formed so as to communicate with the nozzle holes respectively;

the producing method characterized in that the anode bonding method described in 1 is employed as the process of bonding.

10. A producing method of a liquid droplet discharging head, comprising:

a process of preparing a silicon substrate in which a nozzle plate having plural nozzle holes is formed;

a process of preparing a glass substrate in which an intermediate plate is formed wherein the intermediate plate has intermediate through holes which have ports larger than that of the nozzle holes and communicate with the nozzle holes respectively when the glass substrate is bonded with the silicon substrate in which the nozzle plate is formed;

a process of preparing a silicon substrate in which pressure chamber grooves are formed, wherein the pressure chamber grooves form pressure chambers which communicate with the nozzle holes through the intermediate through holes respectively when the silicon substrate is bonded with the glass substrate and the pressure chambers discharge liquid through the nozzle holes due to a change in volume by displacement of an actuator; and a process of bonding the silicon substrate in which the nozzle plate is formed and the glass substrate in which the intermediate plate is formed, and bonding the glass substrate in which the intermediate plate is formed and the silicon substrate in which the pressure chamber groove is formed, so that the pressure chambers are formed so as to communicate with the nozzle holes respectively;

the producing method characterized in that the anode bonding method described in 5 is employed as the process of bonding.

Effects of the Invention

According to the present invention, when a silicon substrate and a glass substrate are bonded by an anode bonding, with a through hole provided in the silicon substrate, a cathode electrode can be brought in contact with the glass substrate from the silicon substrate side. Therefore, an anode electrode and a cathode electrode can be brought in contact with the silicon substrate and the glass substrate respectively from one direction at the silicon substrate side, for example, from a direction vertical to the substrate, and a direct current voltage is applied between both electrodes, whereby anode bonding can be conducted. Moreover, even if there is concern about bonding failure due to the lowering of an electrostatic force in the case that a surface to be bonded is so large that a distance from the position of a cathode electrode to a section to be bonded becomes long, the distance from the position of a cathode electrode to a section to be bonded can be made shorter by providing plural cathode electrodes through plural through holes provided in the silicon substrate.

Therefore, it is possible to provide an anode bonding method and a producing method of a liquid droplet discharging head employing this anode bonding method, in which the anode bonding good can be conducted in good order without causing positional deviations at the time of bonding a silicon substrate and a glass substrate by the anode bonding, even in the case that an electrode cannot be provided to a surface opposite to a surface to be bonded of the glass substrate or even in the case that the surface to be bonded is too large.

BRIEF DESCRIPTION OF THE DRAWINGS

FIG. 1 is an exploded perspective view showing a configuration of an ink-jet type recording head as an example of an ink droplet discharge head.

FIG. 2 is a cross sectional view of the ink-jet type recording head.

EXPLANATION OF REFERENCE SYMBOLS

Figure 3:
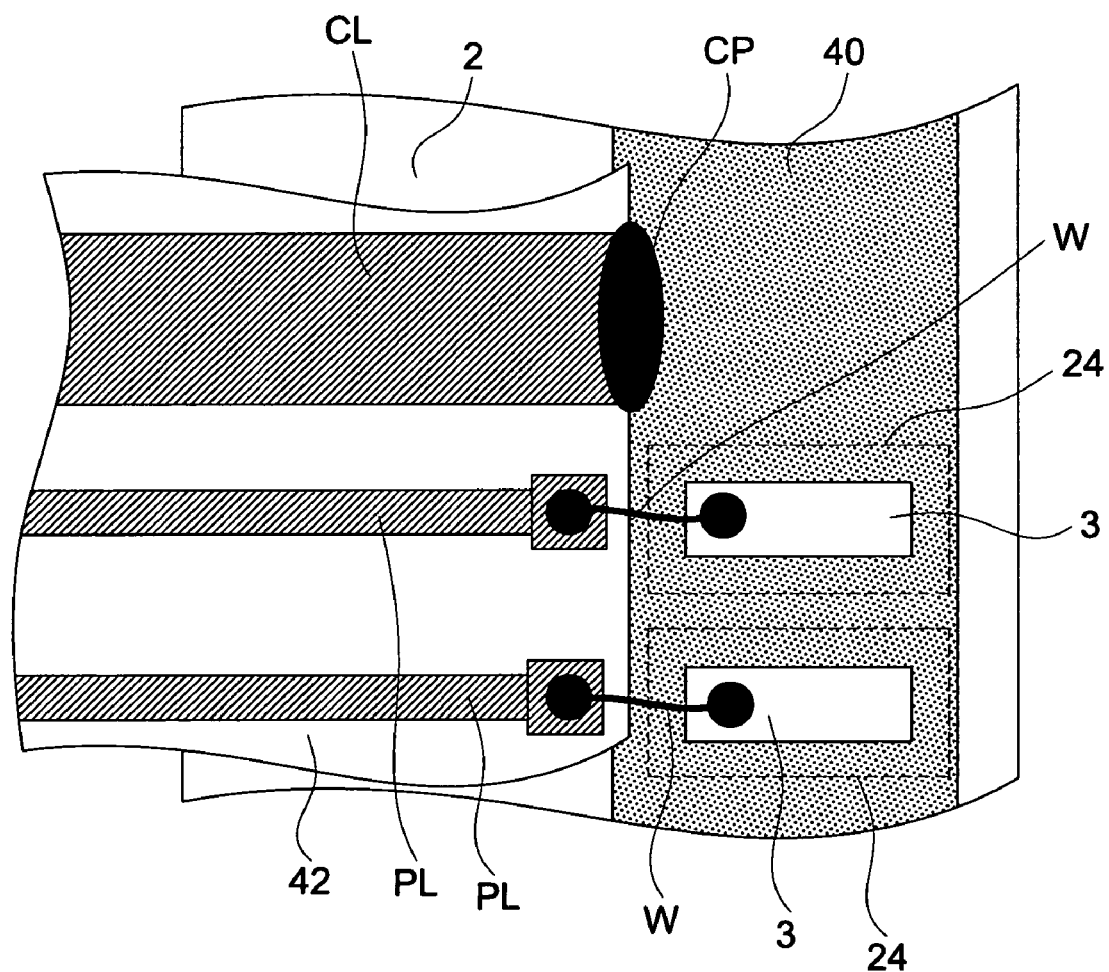
FIG. 3 is a drawing showing a wiring section for driving piezoelectric elements 3 of the ink-jet type recording head and its peripheral section.

100 Recording Head
1 Nozzle Plate
2 Body Plate
3 Piezoelectric Element
5 Intermediate Plate
11 Nozzle Hole
12 Intermediate Through Hole
13 Discharge Surface
20 Fixed Base
20a Base Electrode
21 Ink Feed Port
22 Common Ink Chamber Groove
23 Ink Supply Passage Groove
24 Pressure Chamber Groove
30 Ink Supply Passage
40 Common Electrode
42 Flexible Substrate
45 Liquid Repellent Layer
50 Through Hole
51 First Silicon Substrate
52 First SOI Substrate
52-1, 52-2, 54-1, 54-2 Si Layer
52-J and 54-J Insulating layer
53 Second Silicon Substrate
54 Second SOI Substrate
55 and 81 Glass substrate
71 Cathode Electrode
71a Metal Section
71b Glass section
73 and 74 Anode Electrode
75 Direct Current Voltage Power Source
77 Switch
81 and 82 Glass Substrate
85 and 86 Silicon Substrate
A, B, and C Curve
CL Common Wiring
CP Electro-conductive Adhesive
D, D1, D2, and D3 Distance
PL Separate Wiring
U Flow Passage Unit
P1, P2, and P3 Point
W Wire

BEST MODE FOR CARRYING OUT THE INVENTION

The present invention will be explained based on embodiments show in drawings. However, the present invention is not restricted to these embodiments.

Now, an explanation will be made about an ink droplet discharge head manufactured by a production method of an ink droplet discharge head according to the present invention.

FIG. 1 is an exploded perspective view (a wiring section is not shown) showing a configuration of an ink-jet type recording head 100 (hereafter, referred to as a recording head 100) as one example of the ink droplet discharge head. In FIG. 1, reference number 1 schematically shows a nozzle plate for the ink droplet discharge head (hereafter, merely referred to as a nozzle plate), 5 shows an intermediate plate, 2 shows a body plate, 3 shows a piezoelectric element, and 30 shows an ink supply passage. Further, FIG. 2 is a cross sectional view schematically showing a cross section of the recording head 100 on the condition that the nozzle plate 1 at a position Y-Y', the intermediate plate 5 at a position Z-Z' and the body plate 2 at a position X-X' are bonded (a wiring section is not shown).

On the nozzle plate 1, nozzle holes 11 to discharge ink are arranged in a form of plural arrays. On a surface having discharge ports of the nozzle holes 11 to discharge liquid droplets, a liquid repellent layer 45 is provided. On the intermediate plate 5, intermediate through holes 12 communicating with the nozzle holes 11 are provide. The intermediate through holes 12 have a diameter larger than that of the nozzle holes 11.

In the body plate 2, pressure chamber grooves 24, ink supply passage grooves 23, a common ink chamber groove 22 and an ink feed port 21 are formed. When the body plate 2 is bonded with the nozzle plate 1 via the intermediate plate 5, the pressure chamber grooves 24 become pressure chambers, the ink supply passage grooves 23 become ink supply passages and the common ink chamber groove 22 becomes a common ink chamber.

Further, the nozzle plate 1 and the body plate 2 are bonded across the intermediate plate 5 in such a way that the nozzle holes 11 of the nozzle plate 1 and the pressure chamber groove 24 of the body plate 2 correspond to each other in a combination of one to one, whereby a flow passage unit U is formed. Hereafter, the reference numbers used for the pressure chamber grooves, the ink supply passage grooves and the common ink chamber groove in the above explanation are also used for the pressure chambers, the ink supply passages and the common ink chamber in the same way respectively. Moreover, an ink supply passage 30 is joined so as to communicate with the ink feed port 21, and the ink supply passage 30 is connected to a separately-prepared ink storage section via a pipe (not shown), whereby ink can be supplied to the flow passage unit U.

As shown in FIG. 2, in the flow-passage-unit U, piezoelectric elements 3 as an actuator as for changing the volume of a pressure chamber 24 so as to discharge liquid droplets from the nozzle holes 11 are joined to a side of a bottom section 25 of each pressure chamber 24 opposite to the side of the body plate 2 provided with the nozzle plate 1. Between the body plate 2 and the piezoelectric element 3, provided is a common electrode 40 electrically connected with all the piezoelectric elements 3.

FIG. 3 shows a wiring section for driving the piezoelectric element 3 and its peripheral section at a side of the recording head 100 on which the piezoelectric elements 3 are provided. On the bottom surface of the body plate 2, one end of the flexible substrate 42 is fixed. On the flexible substrate 42, separate wirings PL and common wiring CL are provided. The separate wirings PL corresponding to the piezoelectric elements 3 in a form of one to one are connected to respective piezoelectric elements 3, and a common wiring is connected to the common electrode 40. The connection between the common electrode 40 and the common wiring of the flexible substrate is joined by an electro-conductive adhesive CP, such as a silver paste. Further, the connection between one of the separate wirings PL of the flexible substrate and one of the piezoelectric elements 3 is joined with a wire W by a wire bonding.

The flexible base 42 is connected to a separately-prepared drive circuit of the piezoelectric element 3, and a driving pulse voltage is applied between the common wiring CL and the separate wirings PL, whereby each of the piezoelectric elements 3 can be driven independently. Vibration generated by a driven piezoelectric element 3 is transmitted to the bottom section 25 of the pressure chamber 24, and liquid in the pressure chamber 24 can be discharged as liquid droplets from the nozzle hole 11 by the fluctuation of the pressure in the pressure chamber 24 caused by the vibration of this bottom section 25.

Figure 4:
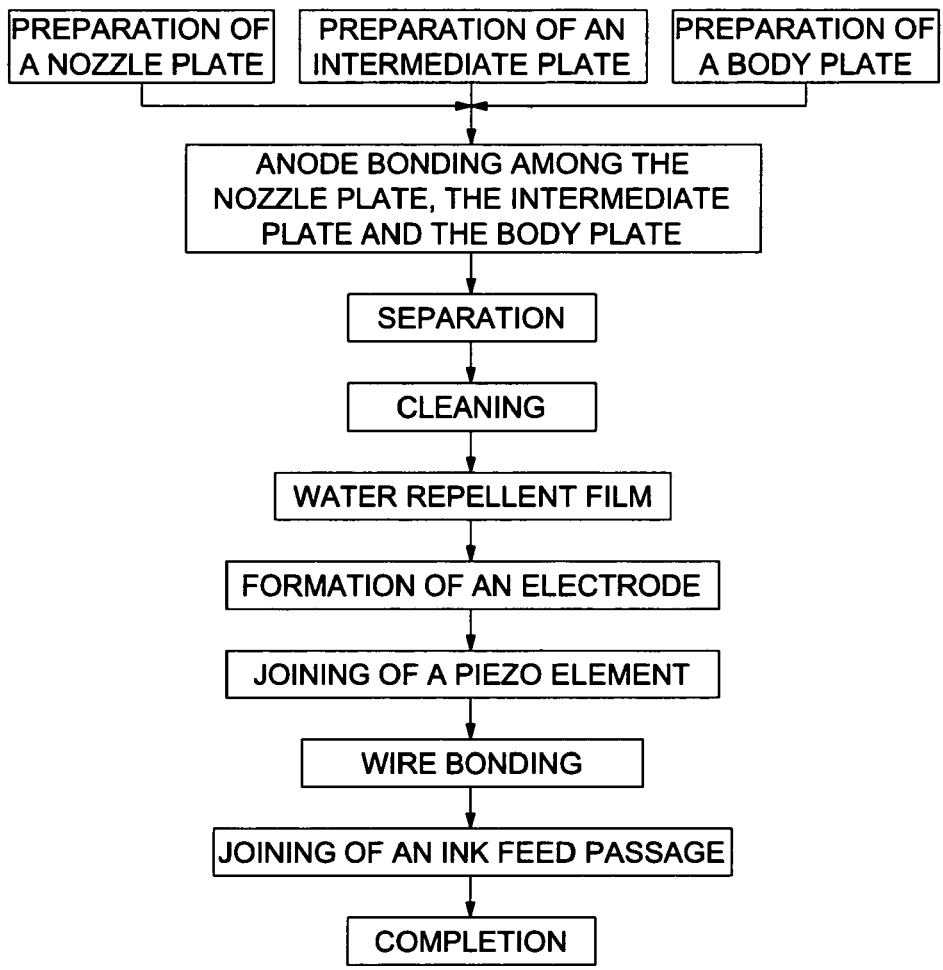
FIG. 4 is a flowchart showing a manufacturing process of the ink-jet type recording head.

A further explanation will be made about a manufacture of the recording head 100 having been explained until now. A flowchart of a manufacturing process is shown in FIG. 4. The manufacture of the recording head 100 will be explained with reference to the flowchart along FIG. 4.

(Preparation of a Nozzle Plate, Preparation of a Body Plate, and Preparation of an Intermediate Plate)

The nozzle plate 1, the intermediate plate 5, and the body plate 2 which constitute the flow passage unit U shown in FIG. 1 are manufactured, respectively. The material forming the nozzle plate 1 and the body plate 2 is made to Si (silicon), and the material forming the intermediate plate 5 is made to borosilicate glass containing movable ion (hereafter, referred to as borosilicate glass). As the material forming the intermediate plate 5, in addition to borosilicate glass, alumina silica glass is employed. However, the material is not limited to these materials, and the material may be a glass which can withstand the temperature at the time of bonding mentioned later and contains metal oxides such as sodium and potassium which moves separately from ions at the time of applying voltage. When these materials are used for the plates as mentioned above, an anode bonding can be conducted easily.

As a method of forming the nozzle holes 11 in the nozzle plate 1, a method of forming the intermediate through holes 12 in the intermediate plate 5, and a method of forming the pressure chamber grooves 24 in the body plate 2, well-known photolithography technology (photo-resist application, exposure, development), etching technology, etc. can be used. As a etching method, a dry etching is desirable. By these methods, the nozzle plate 1, the body plate 2, and the intermediate plate 5 are prepared.

Figure 5:
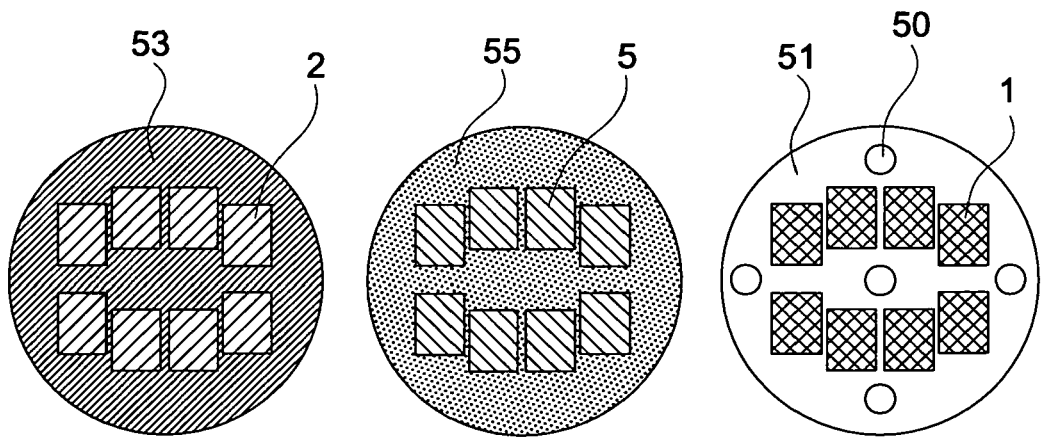
FIG. 5 is a drawing showing a situation that plural body plates, plural intermediate plates and plural nozzle plates are formed in a silicon substrate or a glass substrate respectively.

FIG. 5 shows schematically the state that eight pieces of the body plate 2 are formed in the second silicon substrate 53, the state that eight pieces of the intermediate plate 5 are formed in the glass substrate 55, and the state that eight pieces of the nozzle plate 1 are formed in the first silicon substrate 51.

The eight pieces of the body plate 2, the eight pieces of the intermediate plate 5, and the eight pieces of the nozzle plate 1 are arranged on the second silicon substrate 53, the glass substrate 55, and the first silicon substrate 51 respectively in such a way that when these substrates are laminated with positioning and are bonded to each other, eight pieces of the flow passage unit U as shown in FIG. 1 can be formed. In this case, a mark for positioning, such as a cross may be provided to each substrate of the second silicon substrate 53, the glass substrate 55, and the first silicon substrate 51 in order to make it easy to conduct positioning at the time of piling up these substrates.

These second silicon substrates 53, glass substrate 55, and first silicon substrate 51 are laminated in this order, subjected to a positioning, and then bonded in one body. After the bonding, the bonded substrates are cut by a dicing saw, etc., whereby eight pieces of a flow passage unit U can be obtained.

On the first silicon substrate 51, in addition to the nozzle holes 11, provided is five through holes 50 relating to the present invention in order to provide electrodes being brought in contact with the glass substrate 55 at the time of conducting an anode bonding for the laminated three substrates. The positions of the through holes 50 are determined to positions not to cause problems in the case of manufacturing a flow passage unit, for example positions which do not communicate with the intermediate through holes 12 which communicate with the nozzle holes 11 provided to the glass substrate 55, in addition, it is desirable to determine the positions in consideration of an electrostatic force mentioned later. These through holes 50 can be provided simultaneously when the nozzle holes 11 are formed on the nozzle plate 1, however, it is permissible to provide these through holes 50 by the time when an anode bonding is carried out. On the contrary to the above order, the three substrates are laminated in the order of the first silicon substrate 51, the glass substrate 55, and the second silicon substrate 53, and then subjected to an anode bonding. In this case, as same as the above case, the positions of the through holes 50 are determined to positions not to cause problems in the case of manufacturing a flow passage unit. In addition, it is desirable to determine the positions in consideration of an electrostatic force mentioned later.

It is desirable that the first silicon substrate 51, the glass substrate 55, and the second silicon substrate 53 are sufficiently cleaned and dried so as to make no dust exist on surfaces to be bonded before an anode bonding. Moreover, it is desirable that prior to cleaning and drying, each surface to be bonded of the first silicon substrate 51, the glass substrate 55, and the second silicon substrate 53 is made to a surface roughness less than 10 nm. Concretely, for example, each surface to be bonded is subjected to polishing, such as buffing by the use of diamond paste and the like (a grain size is about in a range of 0.1 μm to 0.3 μm).

When the surface roughness of each surface to be bonded is made, for example, less than 10 nm, three substrates can be well in close contact with each other.

Here, the surface roughness Ra can be measured by the use of, for example, a sensing pin type surface roughness meter Dektak 3030 (produced by Sloan Technology Veeco Instruments Corporation, a sensing pin: made from a diamond, 12.5 μm in radius, stylus pressure: 0.05 mN). Concretely, a surface roughness is measured at three arbitrary positions on a surface, and the surface roughness Ra is obtained as an arithmetic mean value of the three measurements. Here, a width to be measured at the time of obtaining a surface roughness is made to 3 mm.

(Anode Bonding)

Next, the prepared three substrates of the first silicon substrate 51 in which the nozzle plate 1 was formed, the glass substrate 55 in which the intermediate plate 5 was formed, and the second silicon substrate 53 in which the body plate 2 was formed, are laminated, and are subjected to an anode bonding, whereby a flow passage unit U is formed. The situation that these three substrates are laminated is shown in FIG. 6.

Figure 6A:
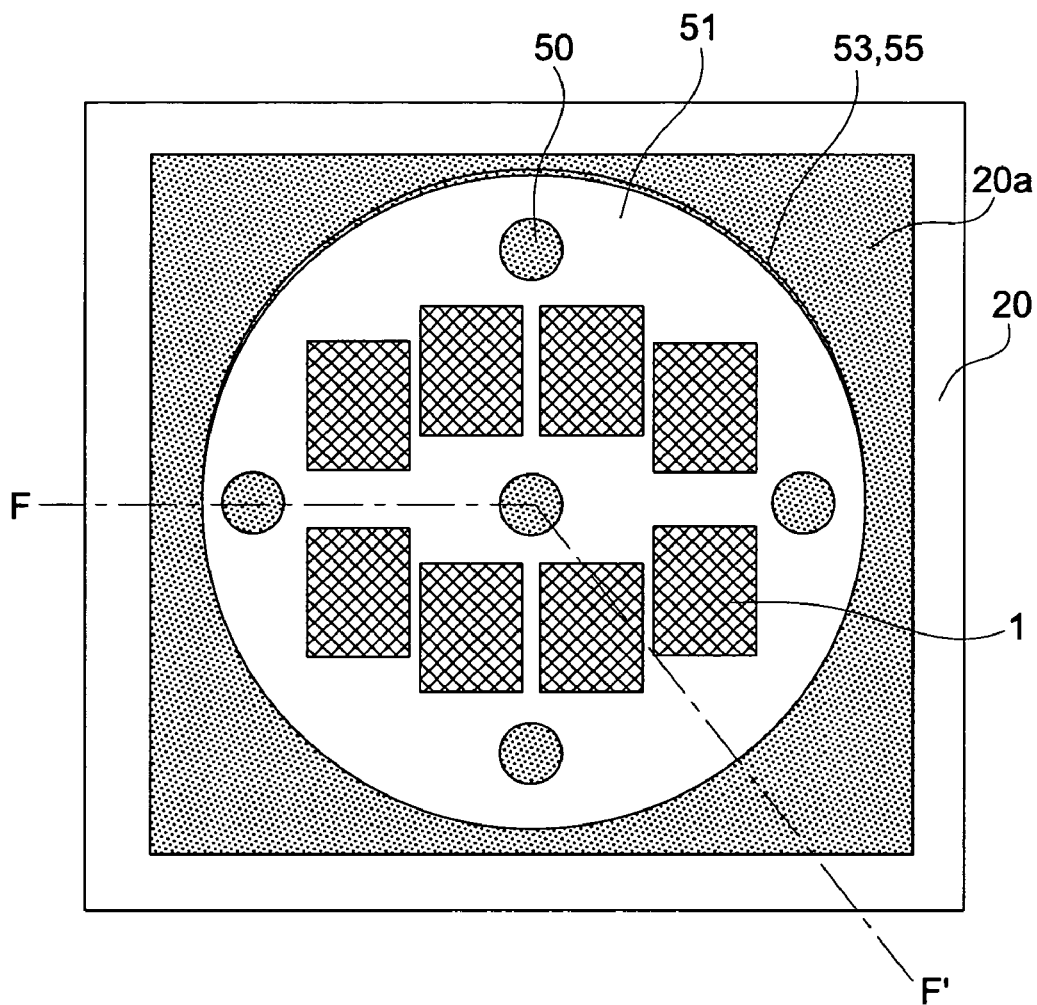
FIG. 6 is a drawing showing a condition that the substrates in which the plural body plates, the plural intermediate plates and the plural nozzle plates are formed are laminated.
Figure 6B:
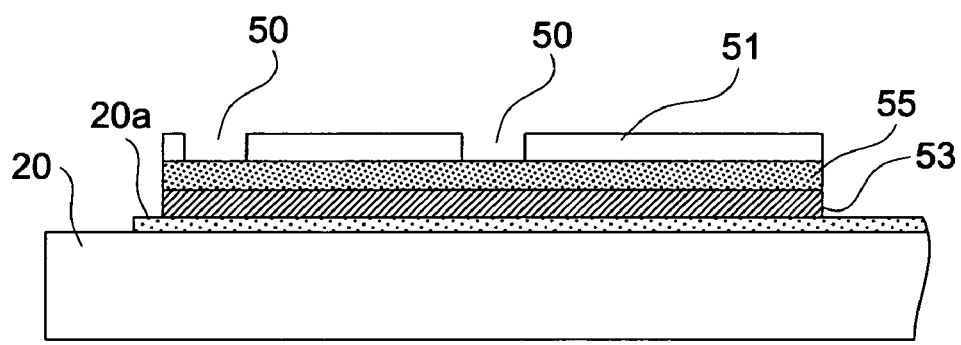

FIG. 6a is an illustration showing the condition that the three substrates are laminated, which is looked from the first silicon substrate 51 being the uppermost substrate, and FIG. 6b is a cross sectional view at the position F-F' in FIG. 6a. Reference number 20 is a fixed base for fixing three plates in order to conduct bonding and 20a is a base electrode larger than the second silicon substrate 53. On the fixed base 20, a heater (not shown) to heat each substrate to be bonded is provided. As shown in FIG. 6, from the base electrode 20a side, the second silicon substrate 53, the glass substrate 55, and the first silicon substrate 51 are laminated in this order such that the surfaces of these substrates to be bonded face to each other, and these substrates are subjected to positioning to adjust their positional relationship so as to constitute flow passage units U by boding.

Figure 7A:
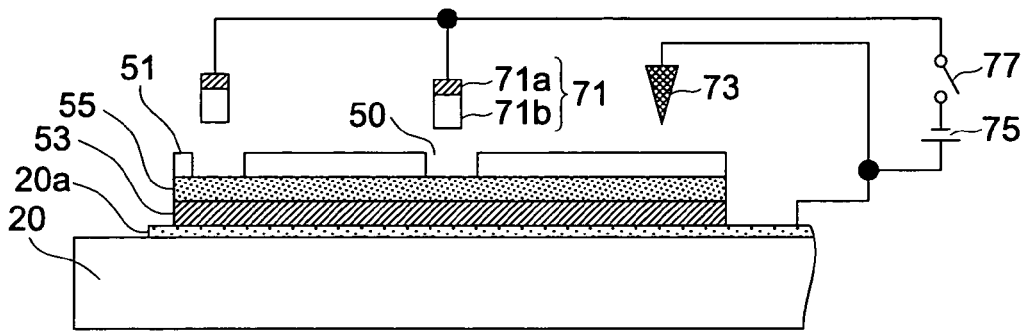
FIG. 7 is an illustration for explaining anode bonding.

Next, electrodes are provided to the first silicon substrate 51 and the glass substrate 55 respectively, and applied with a direct current voltage so as to conduct an anode bonding. An explanation is made about this with reference to FIG. 7. In FIG. 7a, reference number 71 represents a cathode electrode, 73 represents an anode electrode, 75 represents a direct current voltage power source, and 77 represents a switch (in an open status). As the anode electrode 73, for example, metals, such as Au, Cu, aluminum, nickel, and these alloys may be employed. However, if any materials for the anode electrode 73 have a good heat resistance for a heating process mentioned later and a good conductivity, the materials are not limited as the above metals. The cathode electrode 71 consists of a metal section 71a and a glass section 71b. The direct current voltage power source 75 is connected through a switch 77 in such a way that direct current voltage power source 75 applies a plus (+) voltage to the anode electrode 73 being in contact with the first silicon substrate 51 and the base electrode 20a being in contact with the second silicon substrate 53 and a minus (−) voltage to the cathode electrode 71 being in contact with the glass substrate 55. In the example shown in FIG. 7, a power source to perform an anode bonding for the first silicon substrate 51 and the glass substrate 55 and a power source to perform an anode bonding for the second silicon substrate 53 and the glass substrate 55 are made into a common direct current voltage power source 75. However, the above power sources may be provided separately. Further, in the case that the direct current voltage power sources are provided separately, it is desirable to turn on the power sources simultaneously from a viewpoint of bonding efficiency. However, it is not necessary to turn on the power sources simultaneously.

Figure 7B:
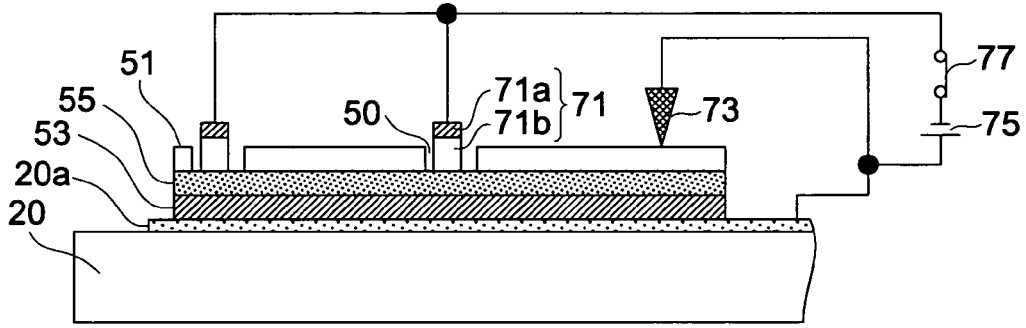

Next, as shown in FIG. 7b, the anode electrode 73 is brought in contact with the first silicon substrate 51, and the cathode electrode 71 is brought in contact with the glass substrate 55, respectively. In this case, the cathode electrodes 71 are brought in contact with the glass substrate 55 via through holes 50 provided in the first silicon substrate 51. At the time of the anode bonding, a power to make these substrates come in close contact with each other is caused by an electrostatic force generated by the direct current voltage applied among these substrates. Accordingly, it may be not necessary to press these substrates toward the fixed base 20.

With regard to the cathode electrode 71 provided to the glass substrate 55, it is desirable to make the cathode electrode 71 come in contact with the glass substrate 55 not only with the metal section 71a but through the glass section 71b. The reason is that an anode bonding is made to be conducted in good order. That is, in the case that, for example, the glass substrate 55 is thin with a thickness of about 0.5 mm and the cathode electrode consists of only the metal section 71a, electric discharge may take place between the metal section 71a of the cathode electrode and the second silicon substrate 53 facing the metal section 71a. However, when the glass section 71b is provided to face the second silicon substrate 53, such electric discharge can be prevented, whereby an anode bonding can be conducted in good order. Further, if the metal section 71a of the cathode electrode comes directly in contact with the glass substrate 55, Na+ ions in the glass substrate 55 may deposit around the metal section 71a of the cathode electrode, and a phenomenon is caused such that which the surface of the glass substrate 55 may be polluted. Therefore, when the glass section 71b is combined with the metal section 71a of the cathode electrode and is brought in contact with the glass substrate 55, there is the effect that the above pollution can be prevented.

It may be desirable that the material of the glass section 71b is the same material as the glass substrate 55 or a borosilicate glass. However, if any materials can bear a heating temperature at the time of the below-mentioned anode bonding and exhibits conductivity nearly equal to that of the borosilicate glass, the materials may be used for the glass section 71b. As a method of constituting the cathode electrode 71 with the metal section 71a and the glass section 71b, for example, a method of forming a metal layer, such as Al, Au and the like on one end of the glass section 71b by a spattering process etc. may be employed. However, the constituting method is not limited to this method.

At the time of bringing the cathode electrode 71 in contact with the glass substrate 55 and bring the anode electrode 73 in contact with the second silicon substrate 51, it is desirable to move each electrode in an approximately perpendicular direction (approximately 90°±10) to a surface (bonded surface) of each of the substrates laminated for the bonding, and to bring the electrode in contact with the corresponding surface. The reason is to avoid positional deviations and uplift. Namely, if each electrode is shifted in an approximately perpendicular direction to a surface to be bonded and brought in contact with the surface, a force is not applied for the substrates on the laminated condition in parallel to the surface to be bonded. Accordingly, it becomes possible to prevent relative positional deviations among the substrates and an uplift of a substrate on a surface to be bonded.

If a position at where the anode electrode 73 is provided on the first silicon substrate 51 is a position where a nozzle plate 1 is not formed, especially a position which does not influence the discharge of droplets in the vicinity of nozzle holes, such a position is not limited especially, because the first silicon substrate 51 has a sufficiently large electric conductivity as compared with the glass substrate 55. For this reason, it is permissible to determine the position appropriately in consideration of an arrangement of the cathode electrode 71 provided to the glass substrate 55 which will be explained later.

With regard to a position at where a cathode electrode is provided to the glass substrate 55, it is desirable to determine the position in consideration of the electric conductivity of the glass substrate 55. Although the electric conductivity of the glass substrate 55 becomes large with a heating process mentioned later, the glass substrate 55 has a small electric conductivity as compared with a silicon substrate. Therefore, if a position at where a voltage is applied to a he glass substrate 55 is separated more from a surface to be bonded by an anode bonding, a sufficient electrostatic force does not work among the substrates to be bonded, and it becomes difficult gradually to perform the anode bonding in good order.

Figure 7C:
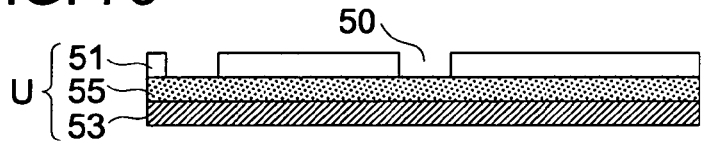
Figure 8:
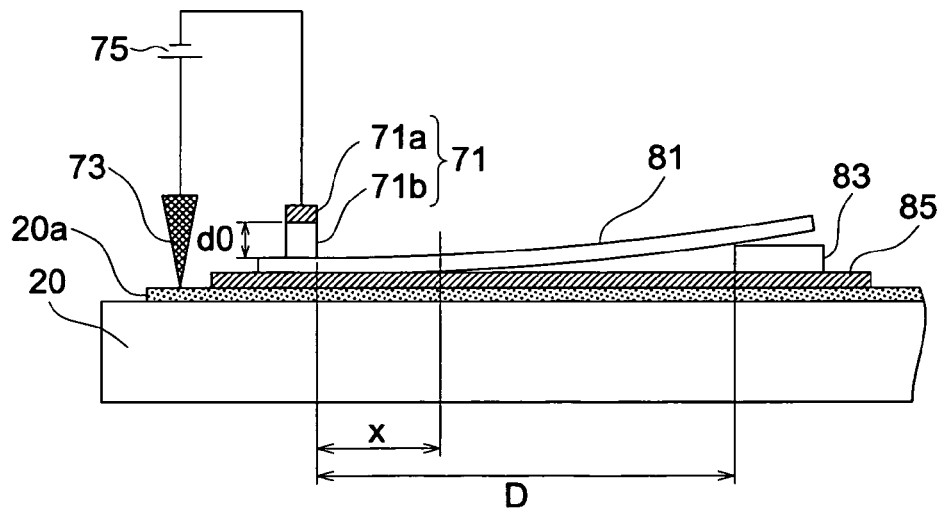
FIG. 8 is an illustration for explaining an experiment to obtain the relationship between an electrostatic force and a distance from a cathode electrode at the time of conducting an anode bonding.

At the time of conducting an anode bonding, the relationship between an electrostatic force to tend to cause bonding a silicon substrate and a glass substrate and a distance from a cathode electrode was examined. This examination will be explained by the use of FIG. 8 and FIG. 9. As shown in FIG. 8, on a fixed base 20 and a base electrode 20a which were explained in FIG. 7, a silicon substrate 85 and a glass substrate 81 were provided. Further, an insulator 83 was inserted between the silicon substrate 85 and the glass substrate 81 at one end of these substrates, and a cathode electrode 71 was provided at another end of the glass substrate 81. In this structure, on the condition that the glass substrate 81 and the silicon substrate 85 were heated, a plus (+) voltage was applied to the base electrode 20a and a minus (−) voltage was applied to the cathode electrode 71 by a direct current voltage power source 75, whereby an anode bonding was performed.

The conditions of the anode bonding are as follows.
Temperature of a bonded surface: 400° C.
Applied voltage: 1 kV
Glass substrate 81: 0.1 mm in thickness, and 3 mm in width (TEMPAX Float® glass)
Length d0 of the glass section 71b of the cathode electrode 71: 1 mm (TEMPAX Float® glass)
Insulator 83: 0.05 mm in thickness quartz glass
The result of this experiment is shown in FIG. 9.

Figure 9:
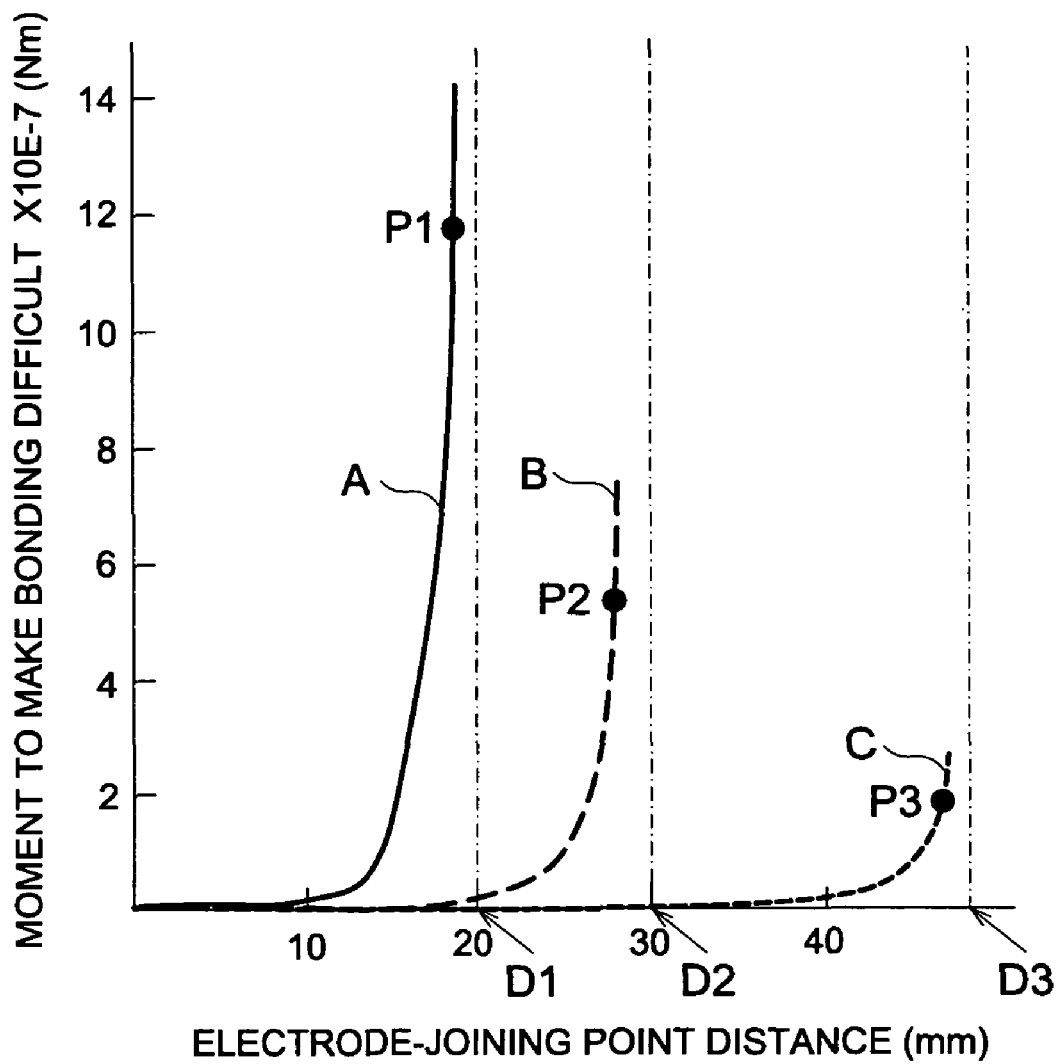
FIG. 9 is a schematic diagram showing the relationship between the electrostatic force and the distance from the cathode electrode at the time of conducting the anode bonding.

The horizontal axis of FIG. 9 represents the distance from the cathode electrode 71 being in contact with the glass substrate 81 to the leading edge of the anode bonding section which shifts by the progress of the anode bonding. Further, the vertical axis represents the bending moment of the glass substrate 81 to make it difficult to keep the glass substrate 81 in contact with the silicon substrate 85, in which the contacting become difficult as the anode bonding progresses.

In the case that a position where the glass substrate 81 and the silicon substrate 85 come in contact with each other is changed in such a way that a distance obtained by the addition of the length d0 of the glass section 71b to the distance D from the cathode electrode 71 to an insulator 83 is changed to D1 (=20 mm), D2 (=30 mm) and D3 (=50 mm) respectively, the simulation results of the bending moment are shown with the curves A, B, and C shown in FIG. 9. In the case that the distance from the boundary between the metal section 71a and the glass section 71b of the cathode electrode 71 to an insulator 83 was made to D1, D2, and D3 respectively and an anode joining was actually performed, the critical position to which the anode joining was able to be conducted is shown with points P1, P2, and P3 on respective curves A, B, and C. As can be seen from these results, it turns out that as the distance from the cathode electrode to a bonded surface becomes longer, the electrostatic force to make both substrates come in close contact with each other becomes weaker, and it become difficult to carry out the anode bonding.

Herein, the bending moment M was obtained from the following formulas (1).

$$\text{Bending moment } M = 3 \times E \times I \times y / (L \times L) \tag{1}$$

In the formula,
E: Young's modulus of the glass substrate 81
I: Cross sectional second moment of the glass substrate 81
y: Thickness of an insulator 83
L: Length (=D−x) of non-bonded section
x: Length of bonded section In actual boding, although there is no big foreign matter which corresponds to the insulator 83 between surfaces to be bonded, there is a case that a gap may have been produced between surfaces to be bonded by waving which a surface of each substrate may have. In this case, if an electrostatic force acting to form a close contact between surfaces in the gap portion becomes weaker, the anode bonding will not progress. As shown in FIG. 10, a distance from a cathode electrode with which an anode bonding can be actually performed was obtained by an experiment in which an anode bonding was conducted actually a the silicon substrate of 50 mm squares and a glass substrate.

Figure 10A:
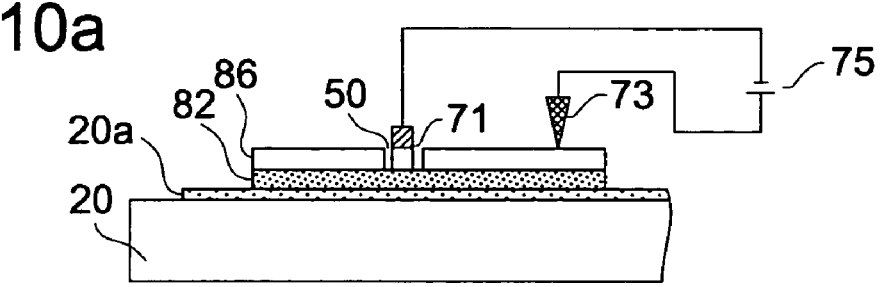
FIG. 10 is an illustration for explaining an experiment to determine a distance from a cathode electrode which can bond well.
Figure 10B:
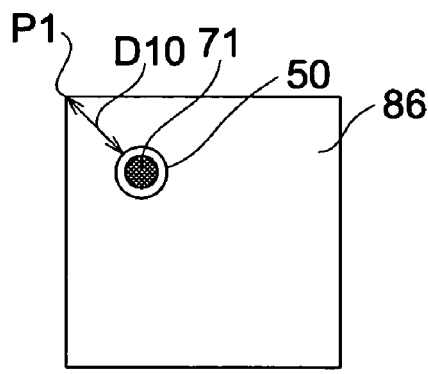
Figure 10C:
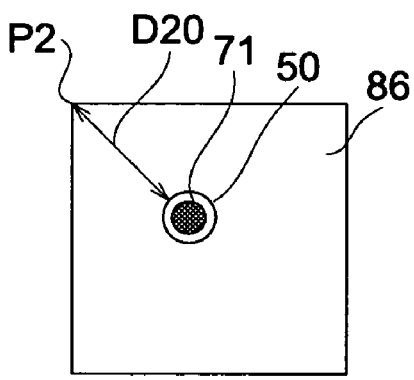
Figure 10D:
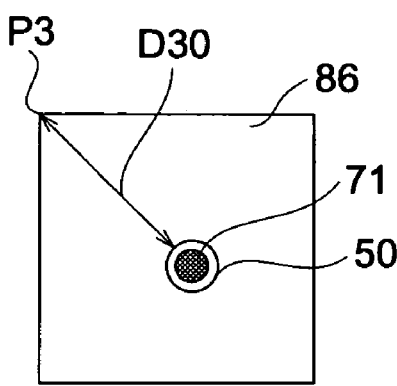

An arrangement of the silicon substrate and the glass substrate at the time of the anode bonding in this experiment is schematically shown in FIG. 10a. Further, FIGS. 10b to 10d are illustrations showing respectively a condition, which is looked from the silicon substrate 86 side (from the upper side), that the silicon substrate 86 of 50 mm squares and the glass substrate 82 are arranged and laminated in this order on the base electrode 20a on the fixed base 20 shown in FIG. 10a. Through holes 50 with a diameter φ of 3 mm were arranged on the silicon substrate 86 such that the boundary between the metal section 71a and the glass section 71b of the cathode electrode 71 on respective through holes 50 was located at positions distant from one apex of P1, P2, P3 on the bonded surface of the silicon substrate 86 and the glass substrate 82 by 20 mm, 30 mm and 50 mm respectively. Through these through holes 50, the cathode electrodes 71 (diameter φ: 2 mm) were connected to the glass substrate 82 without coming in contact with the silicon substrate 86.

In FIGS. 10b to 10(d), the length (height) of the glass section 71b was 1 mm, D10, D20, and D30 are 19 mm, 29 mm, and 49 mm respectively, and a distance from the boundary between the metal section 71a and the glass section 71b of the cathode electrode 71 to the apex P1, P2, and P3 was set to 20 mm, 30 mm, and 50 mm, respectively. The surfaces to be bonded were heated at 400° C. On this condition, the anode bonding was performed 20 times by the application of a direct current voltage of 1 kV between the base electrode 20*a* and the cathode electrode 71 for 30 minutes for each time. As a result, the percentage that the bonding has reached each apex of P1, P2, and P3 was 100%, 70%, and 40% to the distance of 20 mm, 30 mm, and 50 mm, respectively. From this experimental result, it is desirable that the maximum distance from the boundary between the metal section 71*a* and the glass section 71*b* of the cathode electrode 71 with which a bonding can be made surely is made 20 mm or less. Therefore, in order to perform an anode bonding surely, it is desirable to arrange a metal section of a cathode electrode to locate less than 20 mm from an anode bonding position. Here, whether the bonding has been accomplished or not was judged through visual confirmation for the bonded region by the use of an infrared microscope.

In the case of conducting an anode bonding, as main conditions, there are an anode bonding temperature and a direct current voltage to be applied. The anode bonding temperature is desirable in a range of 350° C. to 550° C. When the temperature is made within this range, it becomes possible to make movable ions, such as Na+ in the glass substrate 55 be able to move.

Although a direct current voltage changes a little depending on the concentration of movable ions, such as Na+ in the glass substrate 55, the direct current voltage is desirably in a range of 0.5 kV to 2 kV, and more desirably from about 0.8 kV to 1.5 kV. If the voltage is 0.5 kV or less, since movement of movable ions becomes slow, a bonding may take time. On the other hand, when the voltage is 2 kV or more, it is required to secure insulation for such a high voltage. Further, depending on the conditions of the environment (for example, humidity etc.), there is a possibility that electric discharge may take place in the form of passing through an intermediate plate 5 to be bonded, which results in bonding defects.

The anode bonding is a phenomenon that movable ions in the glass substrate 55 move and diffuse by the attraction of a high-electric field under an anode bonding temperature, and it is desirable to use a glass in which this phenomenon is remarkable. Desirable examples of the glass include TEMPAX Float® and PYREX®. TEMPAX Float® and PYREX® have Na$^+$ as movable ions, and when Na$_2$O becomes Na$^+$ and O$^{2-}$ at the time of high temperature, O$^{2-}$ diffuses into the other material, whereby bonding is established.

Further, it is desirable that the thermal expansion coefficient of each of the three plates to be bonded is near to each other. For example, other than the above-mentioned glasses, even if soda glass as a popular name (it is also called blue plate glass) is used, it is possible to conduct an anode bonding between it and a Si plate. However, there is a possibility that breakage such as crack may be caused by a stress generated by a difference in thermal expansion coefficient between them in a cooling process to room temperature after the bonding.

Further, there is a case that a SOI (Silicon On Insulator) substrate having a three layer structure (Si/SiO$_2$/Si) is used in place of a silicon substrate as a substrate used for producing a nozzle plate 1 and a body plate 2. Since a SiO$_2$ layer differs in etching rate from a Si layer, an etching depth is made with sufficient precision by the utilization of this SiO$_2$ layer as an etching stopping layer. For example, in the case of producing a nozzle plate equipped with nozzles having a two stage structure, it is possible to produce with sufficient precision a length of nozzles at the side on which liquid droplets are discharged. Further, in the case of producing a body plate equipped with a vibrating plate to generate a pressure to discharge liquid droplets, it is possible to produce the thickness of the vibrating plate with sufficient precision. When such a SOI substrate is used in place of a silicon substrate, if the insulation of an inner layer of the SOI substrate is high (for example, a SiO$_2$ layer is thick), there is a possibility that an anode bonding may be unable to be performed in good order by only the structure that the base electrode 20*a* and the anode electrode 73 are brought in contact with the surface of a silicon substrate.

Figure 11:
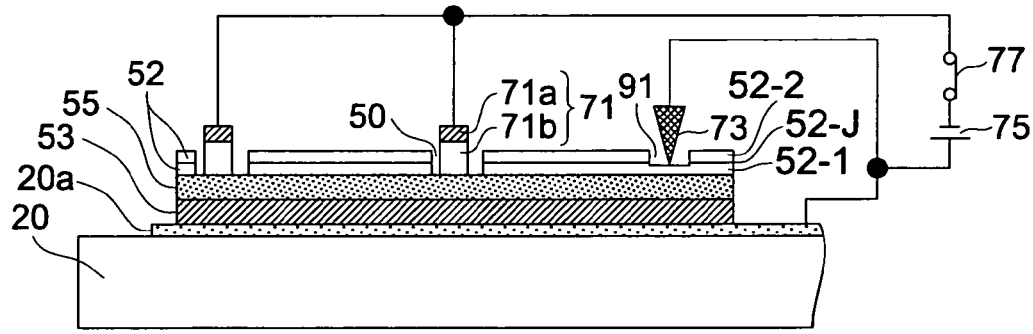
FIG. 11 is an illustration showing an example for conducting an anode bonding in the case of using a SOI substrate instead of a silicon substrate.

FIG. 11 shows an example to perform an anode bonding in the case that a SOI substrate is used in place of the first silicon substrate 51 in which the nozzle plate 1 is formed. In FIG. 11, reference number 52 is a first SOI substrate in which a nozzle plate 1 is formed, 52-J is an insulating layer of SiO$_2$ which is positioned at the inside of the first SOI substrate 52, and 52-1 and 52-2 represent respectively a Si layer to sandwich the insulating layer 52-J. In the case of bonding the first SOI substrate 52 to the glass substrate 55, it is desirable to form a void 91 so as to reach the Si layer 52-1 of the first SOI substrate 52 that is in contact with the glass substrate 55, and to bring the anode electrode 73 in contact with this void 91. Further, a through hole 50 is provided in the first SOI substrate 52 in the same way as in the above-mentioned first silicon substrate 51, and a cathode electrode 71 is brought in contact with the glass substrate 55 through this through hole 50.

With the void 91 formed in the above way, when an anode bonding is performed for the first SOI substrate 52 and the glass substrate 55, as with the cathode electrode 71, it is possible to bring an anode electrode 73 in contact with a Si layer 52-1 by shifting it in a direction perpendicular to surfaces (surfaces to be bonded) of the first SOI substrate 52 and the glass substrate 55 which are laminated. With this arrangement, since power is not applied in a direction parallel to the surfaces to be bonded, there is no possibility that positional deviations takes place relatively between the substrates and an uplift of a substrate occurs on a surface to be bonded. As a result, a good anode bonding can be performed.

In FIG. 11, the SOI substrate is used in place of the first silicon substrate 51. However, if the SOI substrate is used as the second silicon substrate 53 instead of the first silicon substrate 51, a bonding is also performed in the same way.

Figure 12:
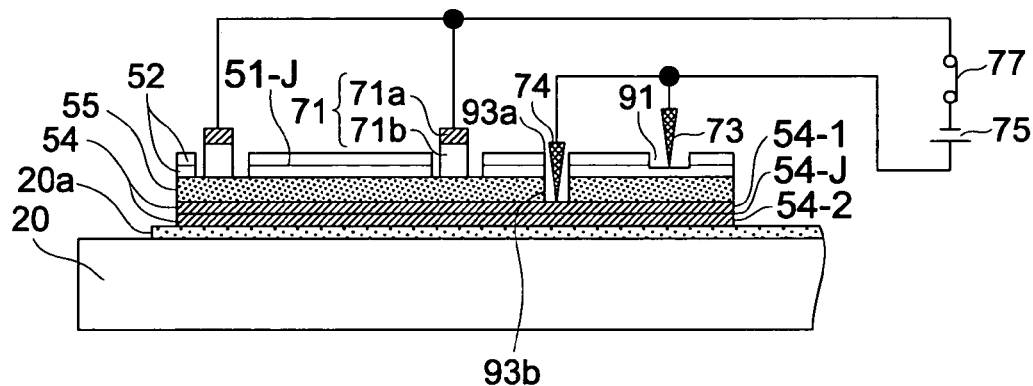
FIG. 12 is an illustration showing an example for conducting an anode bonding in the case of using a SOI substrate instead of a silicon substrate.
Figure 13:
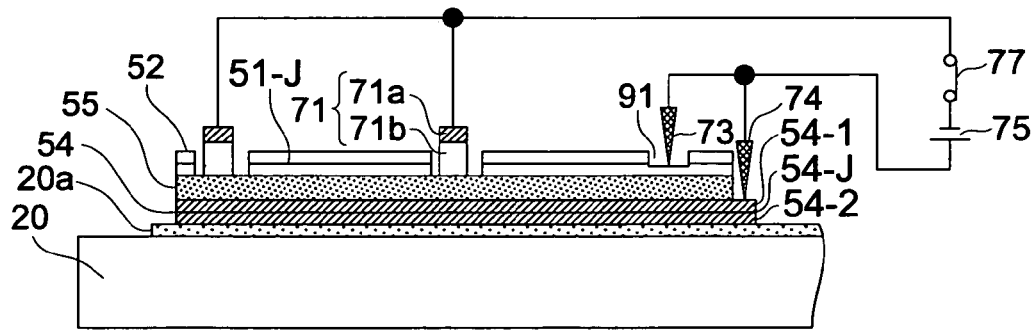
FIG. 13 is an illustration showing an example for conducting an anode bonding in the case of using a SOI substrate instead of a silicon substrate.

FIGS. 12 and 13 show an example to perform an anode bonding in the case that a SOI substrate is used in place of the first silicon substrate 51 as a substrate in which the nozzle plate 1 is formed and also a SOT substrate is used in place of the second silicon substrate 53 as a substrate in which the body plate 2 is formed. Since a silicon substrate has a good conductivity as compared with a glass substrate, it is not necessary to take consideration for the distance between the position where an electrode is provided and a surface to be bonded, different from the case of a glass substrate. Therefore, for example, as shown in FIG. 12, through holes 93*a* and 93*b* are provided to the first SOI substrate 52 in which the nozzle plate 1 is formed and the glass substrate 55 respectively at a position to cause no problem at the time of constructing a flow passage unit U in such a way that the through holes 93*a* and 93*b* are in communication with each other when the first SOI substrate 52 and the glass substrate 55 are laminated. Through these through holes 93*a* and 93*b*, the anode electrode 74 is provided to be brought in contact with the Si layer 54-1 of the second SOI substrate 54 in which the body plate 2 is formed. Here, reference number 54-2 is a Si layer and 54-J is a SiO$_2$ layer.

Further, since a silicon substrate has a good conductivity, the anode electrode 74 can be formed at the end of the Si layer 54-1 of the second SOI substrate 54. For example, as shown in FIG. 13, a part of the end of each of the first SOI substrate 52 and the glass substrate 55 is cut out such that a part of the Si layer 54-1 of the second SOI substrate 54 is exposed, and the anode electrode 74 is provided in this exposed portion.

In any one of the cases of FIG. 12 and FIG. 13, all of the cathode electrode 71 and the anode cathodes 73 and 74 are brought in contact by being shifted in a direction perpendicular to surfaces (surfaces to be bonded) of the glass substrate 55, the first SOI substrate 52 and second SOI substrate 54 which are laminated. With this arrangement, since power is not applied in a direction parallel to the surfaces to be bonded of the first SOI substrate 52, the glass substrate 55 and second SOI substrate 54, there is no possibility that positional deviations takes place relatively between the substrates and an uplift of a substrate occurs on a surface to be bonded. As a result, a good anode bonding can be performed.

Figure 14A:
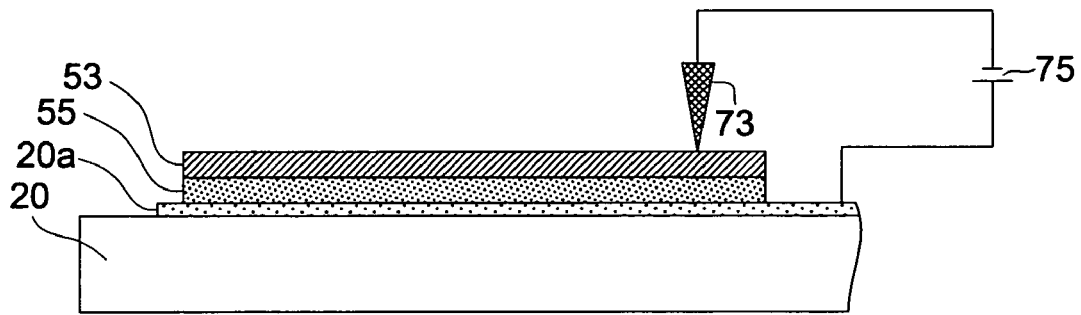
FIG. 14 is an illustration showing an example for conducting an anode bonding for three substrates of a silicon substrate, a glass substrate and a silicon substrate by two steps.
Figure 14B:
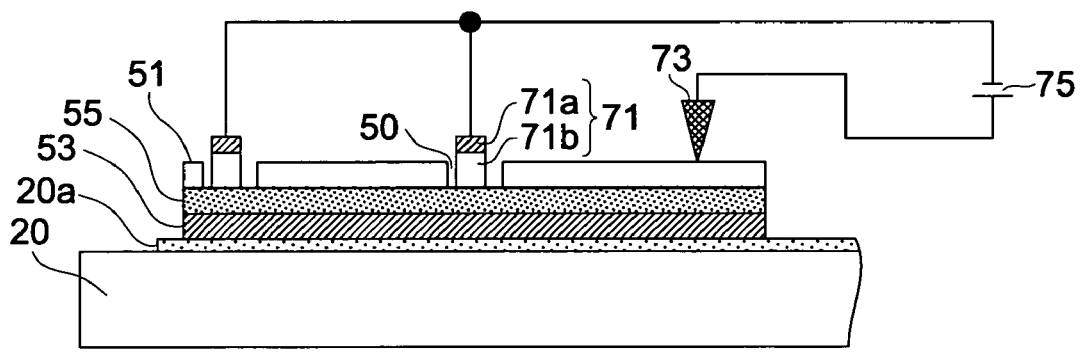
Figure 14C:
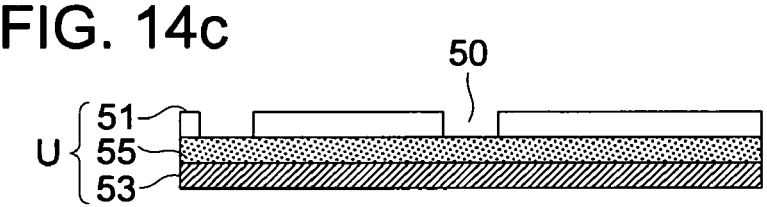
Figure 15A:
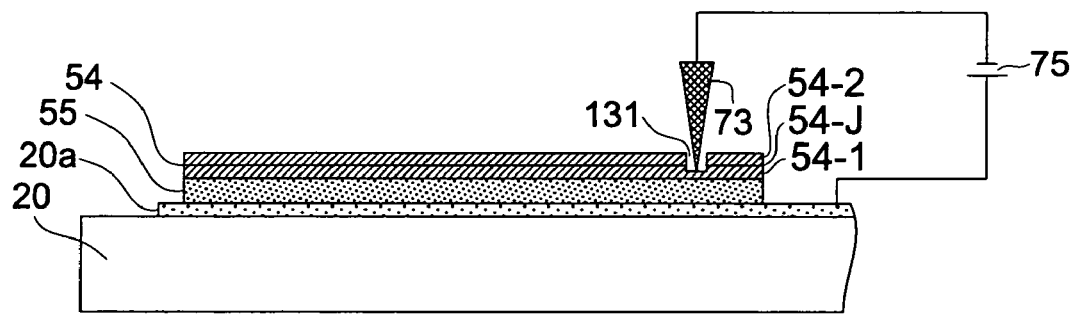
FIG. 15 is an illustration showing an example for conducting an anode bonding for three substrates of a SOI substrate, a glass substrate and a SOI substrate by two steps.
Figure 15A:
Figure 15B:
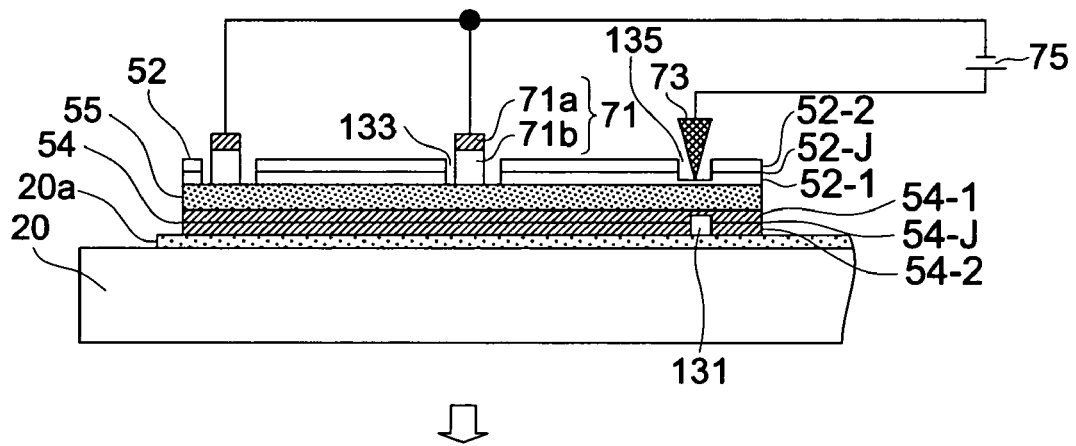
Figure 15B:
Figure 15C:
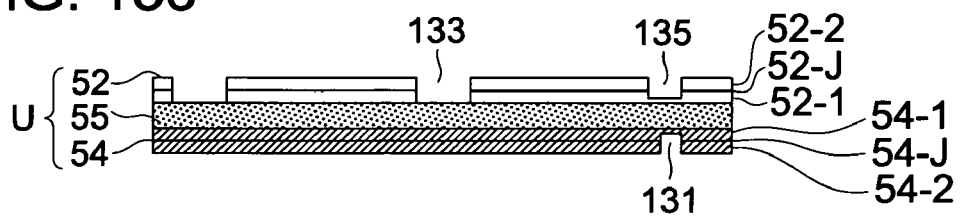

In the examples having been explained hitherto, the explanation has been made about the case where the silicon substrate, the SOI substrate and the glass substrate in which the body plate 2, the intermediate plate 5 and the nozzle plate 1 are formed respectively, are simultaneously bonded together by the anode bonding method. When three substrates are simultaneously bonded, a manufacturing process can be simplified, and a manufacturing efficiency, such as shortening of production time can be made well. On the other hand, there is a considerable case to produce a low passage unit U by conducting an anode bonding sequentially in an order such that the second substrate 53 in which the body plate 2 is formed and the glass substrate 55 in which the intermediate plate 5 is formed are bonded for convenience of manufacture, and next the glass substrate 55 and the first silicon substrate 51 in which the nozzle plate 1 is formed are bonded or in another order in which the body plate is replace with the nozzle plate in the above order. For example, as shown in FIG. 14, there is a case in which, first, the second silicon substrate 53 is bonded to the glass substrate 55 (FIG. 14a), and then, the first silicon substrate 51 is bonded to the surface of the glass substrate 55 opposite to the surface on which the second silicon substrate is bonded (FIG. 14b), whereby a flow passage unit U is manufactured. In this case, as sown in FIG. 14a, the second silicon substrate 53 and the glass substrate 55 are bonded with a conventional anode bonding method. Next, as shown in FIG. 14b, the first silicon substrate 51 provided with a through hole 50 is laminated on the surface of the glass substrate 55 opposite to the surface on which the second silicon substrate 53 is bonded, and then, the cathode electrode 71 is brought in contact with the glass substrate 55 through the through hole 50, whereby an anode bonding can be performed. In this way, with the through hole 50 provided in the first silicon substrate 51, even if the surface of the glass substrate 55 opposite to the surface to be bonded is not in an exposed condition such that the surface can come in contact with the base electrode 20a, an anode bonding can be performed in good order.

FIG. 15 shows an example to perform an anode bonding sequentially for the first SOI substrate 52 and the second SOI substrate 54 to the glass substrate 55 in place of the first silicon substrate 51 and the second silicon substrate 53 shown in FIG. 14. As shown in FIG. 15a, the second SOI substrate 54 and the glass substrate 55 are bonded by an anode bonding method. At this time, the hollow 131 which reaches Si layer 54-1 of second SOI substrate 54 that touches the glass substrate 55 is formed, and this hollow 131 is touched in the anode electrode 73. At this time, a void 131 is provided so as to reach the Si layer 54-1 of the second SOI substrate 54 that is in contact with the glass substrate 55, and the anode electrode 73 is made to come in contact with this void 131. Next, the first SOI substrate 52 provide with a through hole 133 and a void 135 as with the above is laminated on the surface of the glass substrate 55 opposite to the surface on which the second SOI substrate 54 is bonded, and the cathode electrode 71 is brought in contact with the glass substrate 55 through the through hole 133. The voids 131 and 135 are not needed to be shaped in a form of a void having a cylindrical side wall, and may be shaped in a cut-out in a peripheral section as shown in FIG. 13.

Therefore, when a silicon substrate or a SOI substrate is bonded to a glass substrate by an anode bonding, if an electrode cannot be appropriately arranged due to reasons such as the existence of a structure that a silicon substrate has been already bonded to a surface of a glass substrate opposite to a surface to be bonded, the anode bonding method of the present invention which provides a through hole in a silicon substrate or a SOI substrate to be subjected to an anode bonding and brings a cathode electrode in contact with a glass substrate through this hole, is a prevailing method in performing bonding in good order.

Annealing may be performed for easing distortion due to bonding after an anode bonding.

After the completion of the anode bonding, flow passage units U formed by the anode bonding of a body plate 2, an intermediate plate 5 and a nozzle plate 1 are separated respectively from the bonded substrates by a dicing saw.

(Cleaning)

Next, the flow passage units U formed by the anode bonding of a body plate 2, an intermediate plate 5 and a nozzle plate 1, especially, discharging surfaces 13 of the nozzle plate 1 to be provided with a liquid repellent layer 45 are fully cleaned with, for example, an RCA cleaning method by the use of an ultrasonic cleaning device. When a liquid repellent layer 45 is provided on a cleaned discharge surface, the adhesion power of the liquid repellent layer 45 to the discharge surface 13 can fully be secured, and the durability of the liquid repellent layer 45 can be improved. Even if the discharge surface 13 is scrubbed and wiped with a head cleaner for cleaning the discharge surface 13 at the time of operating a recording head, the liquid repellent layer hardly separate easily, it becomes possible to maintain a good performance of discharging liquid droplets for a long period of time. Further, ashing treatment (it is also called oxygen plasma treatment) may be conducted by oxygen plasma after the ultrasonic cleaning.

(Formation of Liquid Repellent Layer)

Next, a liquid repellent layer provided to a discharging surface is explained. The liquid repellent layer 45 is provided to a discharging surface 13 of the nozzle plate 1 shown in FIG. 2. By providing the liquid repellent layer 45, it is possible to prevent penetration or expansion caused by the familiarization of liquid, discharged from the nozzle hole 11, to the discharging surface 13. Concretely, as the liquid repellent layer 45, for example, if a liquid is a water-based liquid, a material having water repellence is employed, and if a liquid is an oil-based liquid, a material having oil repellence is employed. Generally fluororesins, such as FEP (ethylene tetrafluoride, propylene hexafluoride), PTFE (Polytetra fluoroethylene), fluorinated siloxane, fluoro alkyl silane, and amorphous perfluoro resin, etc. are employed in many cases, and the liquid repellent layer 45 is formed on the discharging surface 13 by a coating method, a vacuum deposition method and an immersion method. The thickness of the liquid repellent layer 45 is determined suitably depending on the material of the liquid repellent layer 45 and the formation method.

The liquid repellent layer 45 can be directly formed on the discharging surface 13 of the nozzle plate 1. However, in order to enhance the adhesion of the liquid repellent layer 45, it is desirable to form the liquid repellent layer 45 through a foundation layer, for example, a TEOS (tetraethoxysilane) film. The TEOS film can be formed by a plasma CVD method with a TEOS gas.

At the time of forming the liquid repellent layer 45, it is desirable to make masking for discharging ports. With the masking, since a liquid repellent layer does not clog discharging ports, good discharging ports can be obtained without the necessity to remove a liquid repellent layer on the parts of discharging ports after the formation of the liquid repellent layer.

(Formation of Electrode)

Next, a common electrode 40 is formed in on a part (a part acting as a so-called vibrating plate) corresponding to a position of a pressure chamber 24 on the back surface (the surface at the side opposite to the side on which there is the nozzle plate 1) of a flow passage unit U after the cleaning (refer to FIGS. 2 and 3). The common electrode 40 becomes one of electrodes to apply a voltage to drive all piezoelectric elements 3 provided in contact with its top. The material constituting this common electrode 40 is not limited specifically, as far as it is a material capable of becoming an electrode. Examples of the material include, for example, Al, Au, Cu, and Ag. Further, in order to enhance adhesion, a foundation layer, such as Cr may be provided. The method of forming the common electrode 40 is not limited specifically. For example, well-known sputtering and vacuum deposition may be employed as the method.

(Joining of Piezoelectric Element)

Next, piezoelectric elements 3 separately prepared are joined on the common electrode 40. On two surfaces to apply a voltage to the piezoelectric elements 3, electrodes, such as Au, are provide beforehand, and one of the two surfaces is joined to the common electrode 40 by the use of an electro-conductive adhesive, such as a silver paste.

(Wiring)

Next, wiring is made so as to supply a voltage to each of the piezoelectric elements 3 joined to the flow passage unit U. A flexible base plate 42 as shown in FIG. 3 is fixed to the back surface of the flow passage unit U with adhesive and the like. The flexible base plate 42 comprises a common wiring CL connected to the common electrode 40 and separate wirings PL connected to each of the piezoelectric elements 3. The common wiring CL is electrically connected to the common electrode 40 with an electro-conductive adhesive CP, such as a silver paste, and the separate wirings PL are connected to each of the piezoelectric element 3s respectively with wire bonding in which for example, Au wires are made as wires W.

(Joining of Ink Supply Passage)

An ink supply passage 30 to supply ink is joined to an ink feed port 21 provided as an opening to the flow passage unit U with adhesives and the like. With the providing of the ink supply passage 30 to the flow passage unit U, an ink storage section (not shown) prepared separately can be connected to the ink supply passage 30 with a pipe, whereby ink can be supplied to the flow passage unit U.

EXAMPLE

The recording head 100 shown in FIG. 1 was produced. The flexible base plate 42 shown in FIG. 3 was provided to the recording head 100, and the flexible base 42 is electrically connected to all the piezoelectric elements 3, whereby it was made possible to drive the piezoelectric elements 3. An explanation is made about this matter along a flow chart shown in FIG. 4 with reference to FIGS. 1, 2, 3, 5, 6, and 7.

(Process of Preparing a Nozzle Plate, Process of Preparing a Body Plate, and Process of Preparing an Intermediate Plate)

The nozzle plate 1, the intermediate plate 5, and the body plate 2 shown in FIG. 1 were prepared by eight pieces respectively by the use of a well-known photolithography technology (photo-resist application, exposure, development) and an etching technology. For the nozzle plates 1 and the body plates 2, used were the first and second silicon substrates 51 and 53 having respective thickness of 300 μm and 500 μm and a diameter of 3 inches. On the nozzle plate 1, provided were 128 nozzle holes 11 having a diameter $\phi$ of 15 μm. In the body plate 2, formed are pressure chamber grooves 24 becoming pressure chambers corresponding to the nozzle holes 11, ink supply passage grooves 23 becoming ink supply passages, a common ink chamber groove 22 becoming a common ink chamber and an ink feed port 21. A Tenpax® glass having a thickness of 350 μm and a diameter of 3 inches was used as the glass substrate 55, and the intermediate plates 5 were provided with 128 intermediate through holes having a diameter $\phi$ of 60 μm so as to communicate with the nozzle holes 11. As shown in FIG. 5, the nozzle plates 1, the intermediate plates 5, and the body plates 2 were formed by eight pieces respectively in the corresponding one of the substrates 51, 55, 53. The nozzle plates 1, the intermediate plates 5, and the body plates 2 were arranged respectively in the corresponding one of the substrates 51, 55, 53 such that when the substrates 51, 55, 53 were laminated and bonded as shown in FIG. 6, the flow passage units U can be formed. Further, through holes 50 having a diameter $\phi$ of 3 mm were provided in the first silicon substrate 51 such that the boundary between the metal section 71a and the glass section 71b of the cathode electrode 71 is located at 20 mm or less from arbitrary positions within a region required to form the flow passage units U. These through holes 50 were provided to the positions at which the through holes 50 do not communicate with the through holes having a diameter $\phi$ of 60 μm which were provided in the intermediate plate 5 and communicates with the nozzle holes 11.

(Bonding)

Next, the nozzle plates 1, the intermediate plates 5, and the body plates 2 were bonded by the use of the anode bonding method. In order to be subjected to an anode bonding, each of surfaces to be bonded was polished by buffing with a diamond paste, whereby the surface roughness Ra of each of the surfaces to be bonded was less than 10 nm. The surface roughness Ra was measured by a sensing pin type surface roughness meter Dektak3030 (produced by Sloan Technology Veeco Instruments, a sensing pin: made from a diamond, 12.5 μm in radius, stylus pressure: 0.05 mN). The surface roughness was measured at three arbitrary position within a measurement width of 3 mm, and the arithmetic mean value of three measurement values was made to the surface roughness Ra.

Next, after the polishing, the first silicon substrate 51 equipped with the nozzle plates 1, the glass substrate 55 equipped with the intermediate plates 5, and the second silicon substrate 53 equipped with the body plates 2 were cleaned sufficiently and dried. Thereafter, as shown in FIG. 7, the base electrode 20a was provided on the fixed base 20 equipped with a heater (not shown), and then, the second silicon substrate 53, the glass substrate 55 and the first silicon substrate 51 were laminated in this order on the base electrode 20a while being subjected to positioning.

Next, the electrode 73 was placed on the first silicon substrate 51. Further, the cathode electrodes 71 were provided in the glass substrate 55 through the through holes 50. Each of the cathode electrodes 71 was composed of a glass electrode section 71b made of a Tenpax® glass having a diameter φ of 2 mm and a length of 1 mm and a metal section 71a made of aluminium provided to one end of the glass electrode section 71b by sputtering.

The direct current voltage power source 75 was connected through the switch 77 so as to apply a plus (+) voltage to the anode electrode 73 being in contact with the first silicon substrate 51 and to the base electrode 20a being in contact with the second silicon substrate 53 and to apply a minus (−) voltage to the cathode electrode 71 being in contact with the glass substrate 55.

The surfaces to be bonded was heated to 400° C. with a heater, and on the condition where the above temperature was maintained, a voltage of 1 kV was applied for 30 minutes by the direct current voltage power source 75, whereby an anode bonding was performed. This voltage applying time was previously determined by an experiment as the time with which the anode bonding was performed sufficiently.

After the completion of the bonding, eight flow passage units were cut out from the substrates with a dicing saw.
(Ultrasonic Cleaning)

Next, the flow passage units U composed of the body plates 2, the intermediate plates 5, and the nozzle plates 1, to which the anode bonding has been completed, were subjected to ultrasonic cleaning. The ultrasonic cleaning was performed as follows.
(1) A liquid bath of a high frequency ultrasonic cleaner (frequency of 0.7 MHz) was filled with an alkaline cleaning liquid with a temperature of 70° C., and the flow passage units U were immersed in this cleaning liquid bath for 15 minutes.
(2) Another liquid bath of a high frequency ultrasonic cleaner (frequency of 0.7 MHz) was filled with purified water, and the flow passage units U were taken out from the alkaline cleaning liquid and were immersed in the purified water bath for 10 minutes.

Next, the flow passage units U taken out from the purified water bath was put into an oven with a temperature of 70° C. for 20 minutes and was dried. Next, the flow passage units U taken out from the oven were placed into oxygen plasma (high-frequency power 300 W) for 30 minutes, whereby an ashing treatment was performed.
(Formation of Liquid Repellent Layer)

Next, a TEOS layer was provided as a foundation layer of a water repellent layer. By a plasma CVD method with a TEOS gas, a TEOS layer with a thickness of 1 μm was provided to the discharging surfaces of the nozzle plates 1 which constitute the flow passage units U.

Next, as a water repellent layer, a fluorinated siloxane based water repellent layer with a thickness of 40 nm was formed on the TEOS layer by a vacuum deposition method with a water repellent vapor deposition material "Evaporation substance WR1: par fluoro alkyl silane" produced by Merck Corporation.
(Formation of Electrodes)

Next, as shown in FIG. 3, after the common electrode 40 made of aluminum was formed by a sputtering technique, the piezoelectric elements 3 were joined on the common electrode 40 by the use of the electro-conductive adhesive composed of a silver paste.

Next, the flexible base plate 42 was joined on the flow passage unit U. The common wiring CL of this flexible base plate 42 was electrically connected to the common electrode 40 by an electro-conductive adhesive CP composed of a silver paste, and separate wirings PL and the electrodes of the piezoelectric elements 3 were electrically connected by wire bonding with a wire W of an Au wire.

(Joining of Piezoelectric Elements, Wiring, Joining of Ink Supply Passage)

Next, the ink supply passage 30 was joined to the flow passage unit U with adhesive.

With the above processes, the recording head 100 was completed.

A drive circuit, separately prepared, to drive the piezoelectric elements 3 was connected to the flexible base plate 42 of the completed recording head 100, the ink supply passage 30 and an ink storage section were connected with a pipe, whereby the recording head 100 was made to be able to discharge ink (water soluble).
(Test and Results)

A test to discharge ink by 10 million times was conducted by the use of eight manufactured recording heads 100, respectively. Any change on the ink discharging condition was not observed in the eight recording heads 100 at the start of the test and after the end of the test, and there was no fault such as ink leakage from the joined parts on the flow passage unit U, and the result of the test was good.

The invention claimed is:

1. An anode bonding method of bonding a glass substrate and a silicon substrate by anode bonding, the method comprising:
arranging the silicon substrate on the glass substrate, wherein the silicon substrate is provided with a through hole;
bringing an anode electrode into contact with a surface of the silicon substrate opposite to a surface facing the glass substrate and bringing a cathode electrode into contact with the glass substrate through the through hole provided in the silicon substrate, wherein the cathode electrode includes a metal section and a glass section connected to the metal section, wherein the metal section is configured to be applied with a direct current voltage, and wherein the glass section is configured to be brought into contact with the glass substrate; and
applying a direct current voltage between the anode electrode and the metal section of the cathode electrode under a condition in which the glass substrate and the silicon substrate are heated.

2. The anode bonding method described in claim 1, wherein the anode electrode and the cathode electrode are shifted from a direction vertical to a top surface of the silicon substrate arranged on the glass substrate and are brought into contact with the silicon substrate and the glass substrate respectively.

3. The anode bonding method described in claim 1, wherein the metal section is located at a position within 20 mm from an arbitrary position on a region where the glass substrate and the silicon substrate are bonded by the anode bonding.

4. The anode bonding method described in claim 1, wherein the metal section comprises a metal vapor-deposited film provided on one end of the glass section.

5. An anode bonding method of sandwiching a glass substrate between a first silicon substrate and a second silicon substrate and conducting anode bonding for the first silicon substrate, the glass substrate, and the second silicon substrate, the method comprising:
arranging the second silicon substrate, the glass substrate, and the first silicon substrate in order on an anode electrode plate which serves as an electrode during the anode bonding, wherein the first silicon substrate is provided with a through hole;
bringing an anode electrode into contact with a surface of the first silicon substrate opposite to a surface facing the glass substrate;
bringing a cathode electrode into contact with the glass substrate through the through hole provided in the first silicon substrate, wherein the cathode electrode includes a metal section and a glass section connected to the metal section, wherein the metal section is configured to be applied with a direct current voltage, and wherein the glass section is configured to be brought into contact with the glass substrate; and applying a direct current voltage between the anode electrode plate and the cathode electrode and between the anode electrode and the metal section of the cathode electrode under a condition in which the second silicon substrate, the glass substrate and the first silicon substrate are heated.

6. The anode bonding method described in claim 5, wherein the anode electrode and the cathode electrode are shifted from a direction vertical to a top surface of the first silicon substrate arranged on the glass substrate and are brought into contact with the first silicon substrate and the glass substrate respectively.

7. The anode bonding method described in claim 5, wherein the metal section is located at a position within 20 mm from an arbitrary position on a region where the glass substrate and the first silicon substrate are bonded by the anode bonding.

8. A method of producing a liquid droplet discharging head, the method comprising:

preparing a nozzle plate silicon substrate in which plural nozzle holes are formed;

preparing an intermediate plate glass substrate in which plural intermediate through holes are formed, wherein each of the plural intermediate through holes has a port larger than that of each of the plural nozzle holes and communicates with one of the plural nozzle holes when the intermediate plate glass substrate is bonded with the nozzle plate silicon substrate;

preparing a body plate silicon substrate in which plural pressure chamber grooves are formed, wherein the plural pressure chamber grooves form plural pressure chambers when the body plate silicon substrate is bonded with the intermediate plate glass substrate, and wherein each of the plural pressure chambers communicates with one of the plural nozzle holes through one of the plural intermediate through holes and discharges liquid through the one of the plural nozzle holes due to a change in volume caused by displacement of an actuator; and bonding the nozzle plate silicon substrate and the intermediate plate glass substrate and bonding the intermediate plate glass substrate and the body plate silicon substrate, so that each of the plural pressure chambers is formed so as to communicate with a respective one of the plural nozzle holes;

wherein one of the nozzle plate silicon substrate and the body plate silicon substrate forms a first silicon substrate and is provided with a through hole; and wherein the first silicon substrate and the intermediate plate glass substrate are bonded by an anode bonding method comprising:

arranging the first silicon substrate on the intermediate plate glass substrate;

bringing an anode electrode into contact with a surface of the first silicon substrate opposite to a surface facing the intermediate plate glass substrate and bringing a cathode electrode into contact with the intermediate plate glass substrate through the through hole provided in the first silicon substrate, wherein the cathode electrode includes a metal section and a glass section connected to the metal section, wherein the metal section is configured to be applied with a direct current voltage, and wherein the glass section is configured to be brought into contact with the intermediate plate glass substrate; and applying a direct current voltage between the anode electrode and the metal section of the cathode electrode under a condition in which the intermediate plate glass substrate and the first silicon substrate are heated.

9. A method of producing a liquid droplet discharging head, the method comprising:

preparing a nozzle plate silicon substrate in which plural nozzle holes are formed;

preparing an intermediate plate glass substrate in which plural intermediate through holes are formed, wherein each of the plural intermediate through holes has a port larger than that of each of the plural nozzle holes and communicates with one of the plural nozzle holes when the intermediate plate glass substrate is bonded with the nozzle plate silicon substrate;

preparing a body plate silicon substrate in which plural pressure chamber grooves are formed, wherein the plural pressure chamber grooves form plural pressure chambers when the body plate silicon substrate is bonded with the intermediate plate glass substrate, and wherein each of the plural pressure chambers communicates with one of the plural nozzle holes through one of the plural intermediate through holes and discharges liquid through the one of the plural nozzle holes due to a change in volume caused by displacement of an actuator; and bonding the nozzle plate silicon substrate, the intermediate plate glass substrate, and the body plate silicon substrate so that each of the plural pressure chambers are formed so as to communicate with a respective one of the plural nozzle holes;

wherein the bonding is performed by an anode bonding method such that one of the nozzle plate silicon substrate and the body plate silicon substrate forms a first silicon substrate and is provided with a through hole, and wherein the other of the nozzle plate silicon substrate and the body plate silicon substrate forms a second silicon substrate; and wherein the anode bonding method comprises:

arranging the second silicon substrate, the intermediate plate glass substrate, and the first silicon substrate in order on an anode electrode plate which serves as an electrode during the anode bonding;

bringing an anode electrode into contact with a surface of the first silicon substrate opposite to a surface facing the intermediate plate glass substrate;

bringing a cathode electrode into contact with the intermediate plate glass substrate through the through hole provided in the first silicon substrate, wherein the cathode electrode includes a metal section and a glass section connected to the metal section, wherein the metal section is configured to be applied with a direct current voltage, and wherein the glass section is configured to be brought into contact with the intermediate plate glass substrate; and applying a direct current voltage between the anode electrode plate and the cathode electrode and between the anode electrode and the metal section of the cathode electrode under a condition in which the second silicon substrate, the intermediate plate glass substrate, and the first silicon substrate are heated.

* * * * *